(12) United States Patent
Kaufmann

(10) Patent No.: US 8,814,479 B2
(45) Date of Patent: Aug. 26, 2014

(54) GROOVING INSERT AND METHOD FOR PRODUCING A GROOVING INSERT

(75) Inventor: Igor Kaufmann, Nürnberg (DE)

(73) Assignee: Kennametal Inc., Latrobe, PA (US)

( * ) Notice: Subject to any disclaimer, the term of this patent is extended or adjusted under 35 U.S.C. 154(b) by 320 days.

(21) Appl. No.: 13/236,924

(22) Filed: Sep. 20, 2011

(65) Prior Publication Data

US 2012/0269588 A1 Oct. 25, 2012

(30) Foreign Application Priority Data

Sep. 29, 2010 (DE) .......... 10 2010 046 848

(51) Int. Cl.
| | |
|---|---|
| B23C 5/20 | (2006.01) |
| B23B 27/16 | (2006.01) |
| B23C 5/22 | (2006.01) |
| B23B 27/04 | (2006.01) |
| B23C 5/08 | (2006.01) |
| B22F 5/10 | (2006.01) |
| B23B 29/04 | (2006.01) |
| B22F 5/00 | (2006.01) |

(52) U.S. Cl.
CPC ......... B23B 27/04 (2013.01); *B23B 2200/3681* (2013.01); *B23B 2205/12* (2013.01); B23B 27/164 (2013.01); B23B 27/1651 (2013.01); B23C 5/2247 (2013.01); *B23C 2200/0455* (2013.01); *B23B 2200/0423* (2013.01); B23C 5/2221 (2013.01); *B23B 2200/0471* (2013.01); B23C 5/08 (2013.01); *B23B 2200/369* (2013.01); *B23C 2200/0416* (2013.01); *B22F 2005/001* (2013.01); *B23B 27/1622* (2013.01); *B22F 5/10* (2013.01); *B23C 2200/367* (2013.01); *B23B 29/043* (2013.01)
USPC .......................................... 407/102; 407/113

(58) Field of Classification Search
CPC ............ B23B 27/04; B23B 2200/3627; B23B 2200/3681; B23B 2200/04
USPC .......................... 407/102, 103, 104, 113, 117
See application file for complete search history.

(56) References Cited

U.S. PATENT DOCUMENTS

| | | | | |
|---|---|---|---|---|
| 5,020,944 | A | * | 6/1991 | Pawlik ............................ 407/42 |
| 5,028,175 | A | * | 7/1991 | Pawlik ............................ 407/40 |
| 7,090,443 | B2 | * | 8/2006 | Hecht et al. .................... 407/48 |
| 7,883,300 | B1 | | 2/2011 | Simpson, III et al. |

FOREIGN PATENT DOCUMENTS

| | | | |
|---|---|---|---|
| DE | 1232436 | A | 1/1967 |
| DE | 699 02 919 | T2 | 6/1999 |
| SU | 667333 | A * | 6/1979 |
| SU | 1180163 | A * | 9/1985 |

* cited by examiner

*Primary Examiner* — Andrea Wellington
*Assistant Examiner* — Alan Snyder
(74) *Attorney, Agent, or Firm* — Larry R. Meenan, Esq.

(57) ABSTRACT

A grooving insert includes a cutting edge extending over the width of the insert, a main flank and a rake face and also a supporting side opposite the rake face. The grooving insert has a substantially cube-shaped outer contour and consists of two geometrically identical cube halves merging into one another in a parting plane. Each cube half has a separate cutting edge and the cube halves lie so as to be rotated by 90° relative to one another and turned by 180° relative to one another.

15 Claims, 6 Drawing Sheets

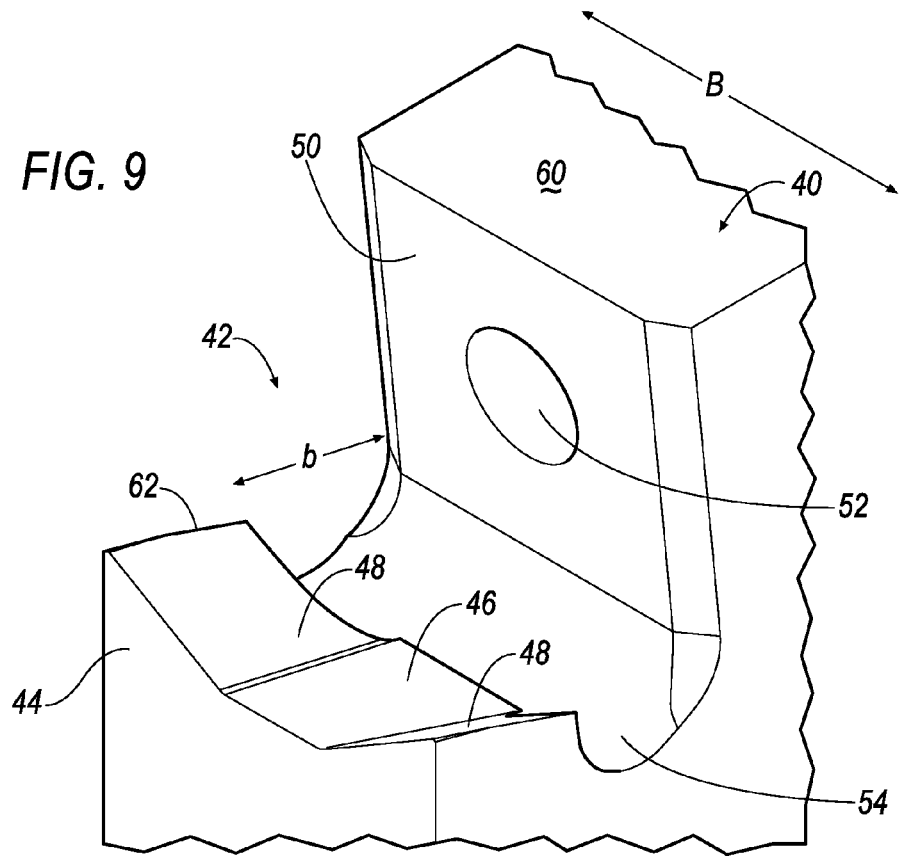
FIG. 9
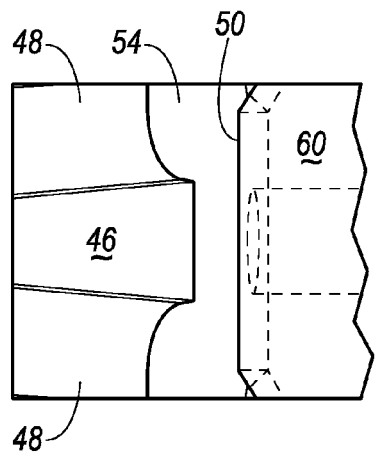
FIG. 10
FIG. 11

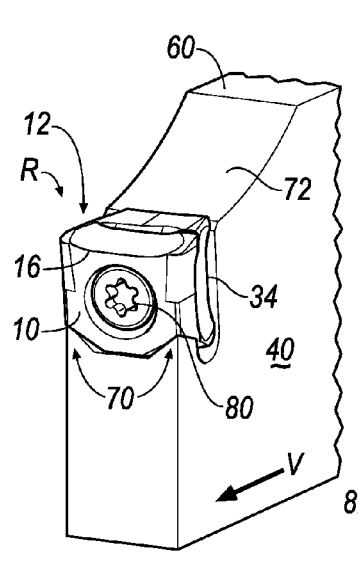
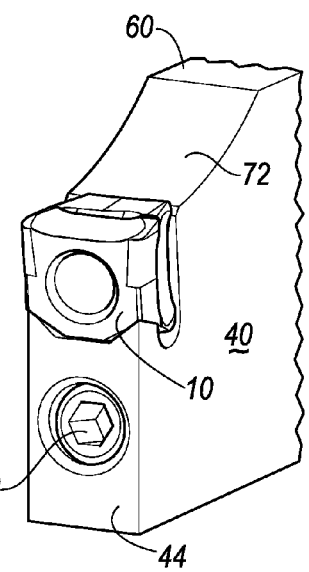
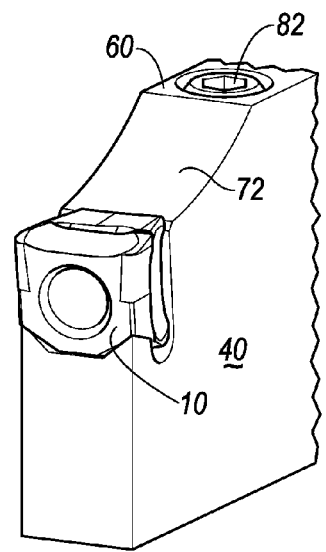
FIG. 12     FIG. 13     FIG. 14
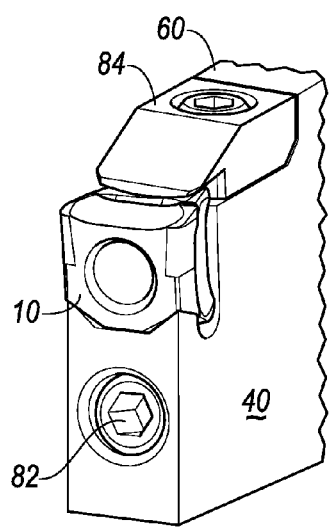
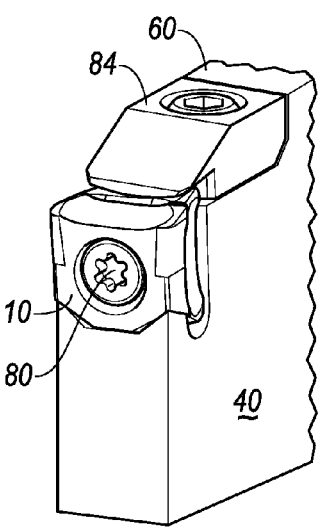
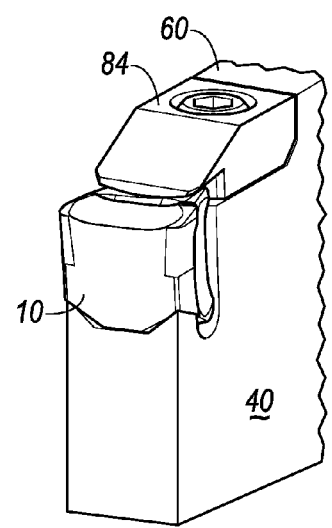
FIG. 15     FIG. 16     FIG. 17

GROOVING INSERT AND METHOD FOR PRODUCING A GROOVING INSERT

CLAIM TO PRIORITY

This application claims priority to German Application No. 10 2010 046848.7, filed on Sep. 29, 2010, the entire contents of all these applications are incorporated herein by reference.

BACKGROUND OF THE INVENTION

1. Field of the Invention

The invention relates to a grooving insert, in particular a tangential grooving insert, comprising a cutting edge extending over the width of the grooving insert, a flank and a rake face and also a supporting side opposite the rake face.

2. Description of Related Art

Grooving inserts are used as interchangeable cutting inserts in deep-recessing or cutting-off tools and in side milling cutters. With such grooving inserts, for example turned workpieces are cut off or bars and tubes are cut to length. Such grooving inserts have a width which is greater than that of the very narrow tool holder, and therefore it is more difficult to provide optimum retention in the case of grooving inserts. Large grooving depths (over 30 mm) in particular cause further problems. The leverages which arise during the clamping of the grooving inserts become increasingly unfavorable at large grooving depths.

By definition, parallelepiped-shaped tangential grooving inserts are distinguished by the fact that the width (as measured in plan view of the rake face) is the largest edge dimension of the parallelepiped. The fastening of the tangential grooving insert on the tool holder is therefore referred to as upright fastening. The length of the grooving insert (as measured in plan view of the rake face) is at most just as large as the width, but in particular is smaller than the width. In standard cutting inserts, however, the length is the largest edge dimension, and therefore the top side with the rake face forms the largest area of the grooving insert. In the tangential grooving insert, however, the side with the main flank is that side of the cutting insert which has the largest area.

WO 2005/099949 A1 shows an example of a tangential grooving insert. In this case, the supporting side is provided with a recess running in a V shape toward the rake face, and the tool has a prominence with an inverse V shape. In addition, the grooving insert has, on its side opposite the rake face, a tongue-shaped retaining lug which runs away from the rake face and with which it engages in a recess in the tool holder.

SUMMARY OF THE INVENTION

The object of the invention is to provide a grooving insert, in particular a tangential grooving insert, which can be readily fastened in the tool holder and is distinguished by a high efficiency.

The object is achieved in the grooving insert of the type mentioned at the beginning firstly in that the grooving insert has a substantially cube-shaped outer contour and consists of two geometrically identical cube halves merging into one another in one piece in a virtual parting plane, wherein each cube half has a separate cutting edge and the cube halves lie so as to be rotated by 90° relative to one another and turned by 180° relative to one another. "Rotated" means rotated about the axis defined by the feed direction. "Turned" means that the two cutting edges lie at the margin of the two oppositely arranged main flanks. The very compact grooving insert according to the invention is therefore embodied as an indexable cutting insert. The cutting edges preferably have the same length.

Furthermore, the grooving insert according to the preferred embodiment is designed as a tangential grooving insert.

As an alternative to or in addition to this solution, the grooving insert is a tangential grooving insert and has a substantially parallelepiped-shaped, preferably cube-shaped outer contour and two cutting edges which are formed by two outer edges of the parallelepiped which are not adjacent to one another.

In previous indexable cutting inserts in which the cutting edges adjoin opposite ends and the top side, there is the problem that the grooving insert, although it first tapers toward the tool holder, then becomes wider again, since the second side lying opposite has the same width as the first. The grooving depth is therefore limited by the length of the grooving insert. These disadvantages are avoided by the invention. Furthermore, the cube shape is compact, material-saving and permits fastening to the holder while avoiding long lever arms or projecting retaining lugs, which are difficult to produce and do not allow indexing of the grooving insert at all.

There are various ways of fastening the grooving insert to the tool holder. On the one hand, the insert can be provided with a fastening opening which preferably starts from the main flank and in particular runs perpendicularly thereto. On the other hand, the insert can be locked on the holder side using a clamping bolt fastening. In addition or as an alternative to this, clamping shoe fastenings can also be provided.

An especially advantageous embodiment provides for the supporting side of each insert to be convexly shaped at least at the margin toward the main flank, such that the insert has an increasing height toward the center (with respect to each individual cutting edge). As a result of this convex shape, which provides no abrupt steps on the supporting side, the grooving insert can firstly be positioned very reliably in the holder and secondly can also be produced at an acceptable cost. This is because it should be noted here that the supporting sides of the two cutting edges form adjacent parallelepiped or cube sides. The production of supporting sides having hitherto conventional concave geometries would be very complicated.

According to the preferred embodiment, the opposite corners at the transition of supporting side, main flank and side surfaces are beveled, preferably in a planar manner. This means that a prism geometry is produced at each supporting side by the corners "drawn" in a direction closer to the cutting edge. This allows the grooving insert to overlap the tool at these corners, as a result of which the insert is centered in a self-locking manner. The cutting force therefore acts increasingly for the retaining force of the grooving insert in the tool, because the cutting force attempts via the beveled corners to press the grooving insert, with the side opposite the flank, to a greater degree against the corresponding bearing surface on the tool.

The supporting side is divided by the bevels into sections, which are referred to as supporting surfaces. The lateral supporting surfaces formed by beveling preferably run obliquely toward one another relative to a central surface lying in between. A type of wedge shape is obtained. The central surface should at the same time run as far as possible parallel to the cutting edge in order to absorb during the cutting the force acting in the tangential direction without a tilting effect occurring.

The central surface can be flat and/or can run parallel to the cutting edge and/or obliquely away from the associated rake face with increasing distance from the flank. If the central surface runs obliquely away from the flank, it should as far as possible have an increasing distance from the opposite side which is provided with the rake face. In other words, if the side having the rake face constitutes the top side, the central surface should run increasingly downward toward the rear side, such that a type of wedge is obtained.

As already mentioned, the second cutting edge has a separate supporting side which is assigned to it and which is shaped geometrically identically to the supporting side of the first cutting edge, to be precise at least in a section which is in contact with the tool holder.

In plan view of the flank of the first cutting edge, the second cutting edge should run substantially perpendicularly to the first cutting edge.

The invention also relates to a tool comprising a tool holder and a grooving insert according to the invention, wherein the tool is a deep-recessing tool, a cutting-off tool or a side milling cutter. The tool according to the invention is distinguished by extreme cutting depths, and still with excellent retention of the grooving insert on the tool holder.

The main flank should project beyond the end face of the tool in the feed direction and/or the top side of the tool should run upward in a curved manner starting from the adjoining rake face, with a rake face extension being formed.

The tool holder has lateral mating surfaces for the lateral supporting surfaces on the grooving insert, at least sections of said mating surfaces being formed complementary to the supporting surfaces, such that planar seating is obtained.

In addition, the tool holder, according to one embodiment, has a rear bearing surface for the side of the grooving insert which is opposite the main flank to bear against.

The tool holder has lateral mating surfaces inclined in particular obliquely to the rear bearing surface and in addition obliquely to one another.

The bearing surface on the tool holder and the lateral, outer side edges of the mating surfaces on the tool holder can be at an angle of 90° to one another.

The bearing surface and the mating surfaces do not need to intersect one another; it is advantageous if a continuous groove is provided in the tool holder in the imaginary intersecting region.

A method according to the invention for producing a grooving insert according to the invention, in particular a tangential grooving insert, provides for the grooving insert to be produced by a pressing technique, in particular by sintering, to be precise in two or more compression directions. These different compression directions are advantageous for producing the relatively complex prismatic supporting side and/or the plurality of cutting edges.

Alternatively, the parallelepiped-shaped or cube-shaped grooving insert is produced by a pressing technique with only a single compression direction, this compression direction running diagonally to the parallelepiped or cube.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

Further features and advantages of the invention follow from the description below and from the following drawings, to which reference is made and in which:

FIG. 9 shows a perspective view from above of the tool holder according to the invention for fastening the cutting insert according to the invention, FIG. 10 shows a side view of the tool holder according to FIG. 9, FIG. 11 shows a plan view of the tool holder as in FIGS. 9 and 10, only in the region of the recess for accommodating the cutting insert, and FIGS. 12 to 17 show various embodiments of the tool according to the invention which are distinguished by different fastenings of the cutting inserts on the tool holder.

DETAILED DESCRIPTION OF THE INVENTION

Figure 1:
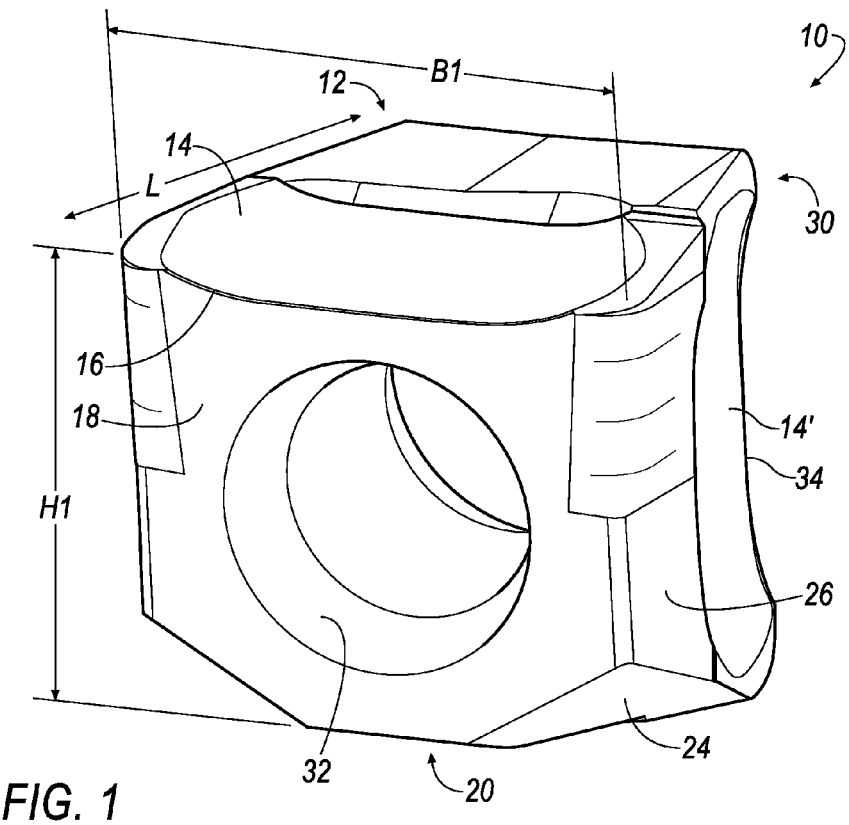
FIG. 1 shows a perspective view of a first embodiment of the grooving insert according to the invention, with a view of two cutting edges and a flank.

Shown in FIG. 1 is a tangential grooving insert 10 which has a top side 12 with a rake face 14 in the form of a flute and a cutting edge 16 extending over the entire width B1 of the grooving insert 10.

The flank 14 and the front main flank 18 meet one another at the cutting edge 16.

The grooving insert 10 has a length L which is less than the height H1 and the width B1. The overall configuration of the grooving insert 10 is substantially cube-shaped.

On the underside, referred to below as supporting side 20, which is opposite the top side 12, the grooving insert 10 is of prismatic design, as can better be seen in FIG. 2.

In the exemplary embodiment shown, the supporting side 20, at least at its margin toward the flank 18, is designed to bulge convexly downward toward the center roughly over half of its length in the direction L.

The center is preferably formed by a flat surface 22, along which the grooving insert 10 has its maximum height H1.

The central surface does not run parallel to the top side 12 but rather, with respect to FIG. 1, obliquely downward in the direction of the rear side 30 opposite the flank 18. This means that the height increases with increasing distance from the flank 18.

Figure 5:
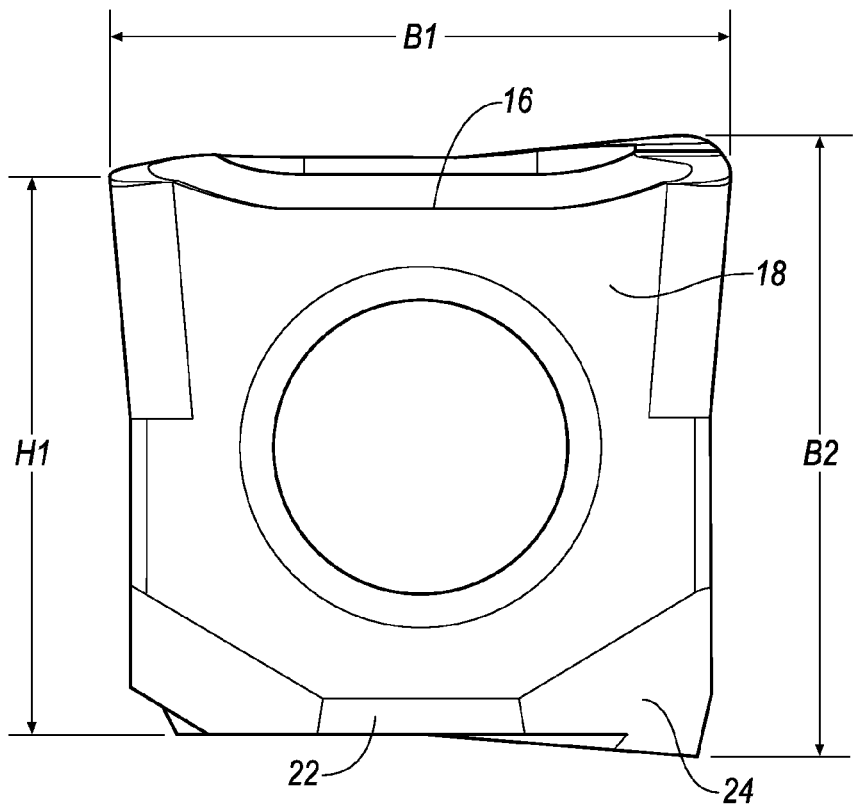
FIG. 5 shows a front view of the main flank of the grooving insert according to FIG. 1.

The height H1, which is measured at the central surface 22, can easily be seen in the front view of FIG. 5.

Lateral supporting surfaces 24 start from the central surface 22 and run at an angle symmetrically to an imaginary center axis M. The lateral supporting surfaces 24 together with the central surface 22 provide the convex, preferably stepless, prism shape.

The lateral supporting surfaces 24 form bevels, to be more precise planar bevels, of the opposite corners of main flank 18, supporting side 20 and side surfaces 26. The bevel, as can be seen in FIGS. 1 and 2, is embodied in such a way that the lateral supporting surfaces 24 extend obliquely towards the flank 18 upward in the direction of the cutting edge 16, to be precise at an angle to the centre axis M and also at an angle toward the top side 12. Thus, as FIG. 2 shows, a prismatic seat for the grooving insert 10 is obtained.

A central opening 32, which is optionally provided and runs as perpendicularly as possible to the rear side 30 and to the main flank 18, serves to fasten the grooving insert 10 to a tool holder, shown later.

The grooving insert 10 shown in FIG. 1 has two cutting edges, namely, in addition to the first cutting edge 16, also an additional, second cutting edge 34. This second cutting edge 34 is at a distance from the first cutting edge 16 and does not merge into it. It is also formed at the margin on the side (rear side 30) opposite the flank 18 and is formed by the transition between the rear side 30 and a side surface 26.

The second cutting edge 34 is therefore arranged on the grooving insert 10 so as to be rotated by 90° and additionally turned by 180° relative to the first cutting edge 16. The side surface 26 assigned to the cutting edge 34 therefore forms the top side with its flute 14' during the cutting with the second cutting edge 34. If the second cutting edge 34 is in use, the flank 18 becomes the rear side and the rear side 30 becomes the main flank, for which reason the surfaces 18, 30 should preferably run parallel.

The second cutting edge 34 also has a prismatic supporting surface, which lies on the side (left-hand side surface with respect to FIG. 1) opposite the rake face 14'.

In general terms it can be said that supporting surfaces 24' and central surface 22' which are assigned to the second cutting surface 34 are geometrically identical to the supporting surfaces 24 and the central surface 22 of the first cutting edge 16.

Figure 2:
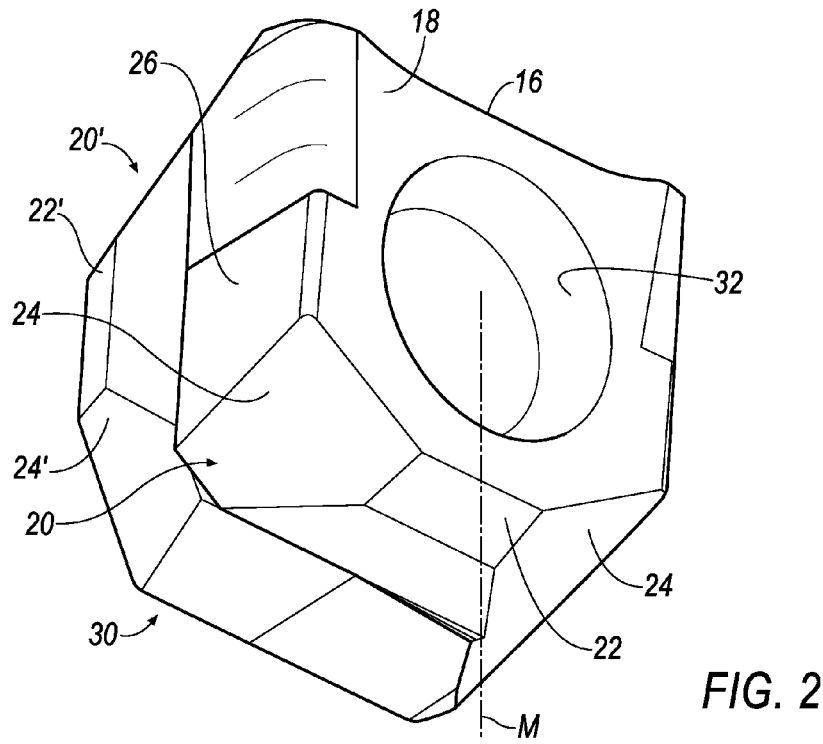
FIG. 2 shows a perspective view, obliquely from below, which shows the grooving insert according to FIG. 1.

A lateral supporting surface 24' and a central surface 22' of the second cutting edge 34 can be seen in FIG. 2. It can also be easily seen here that, starting from the central surface 22', the supporting side 20', in the same way as the supporting side 20, runs increasingly obliquely away from the associated top side.

With respect to the length L of the grooving insert 10, the grooving insert 10 is divided into two by one half being formed with the rake face 14, the cutting edge 16 and the associated surfaces 22, 24, whereas the other half is formed by the second cutting edge 34, the rake face 14' and the associated surfaces 22', 24'. However, the opening 32 is designed as a common opening for fastening the grooving insert 10 during machining by both the first and the second cutting edges 16, 34.

Figure 3:
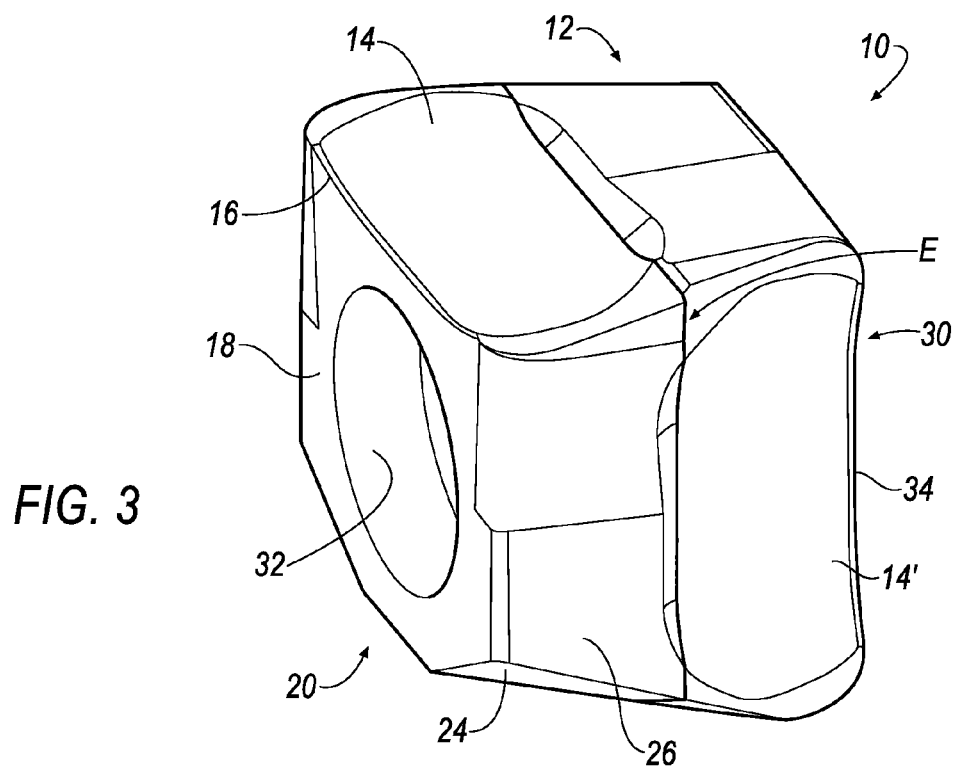
FIG. 3 shows a perspective view, obliquely from the side, which shows the grooving insert according to FIG. 1.
Figure 4:
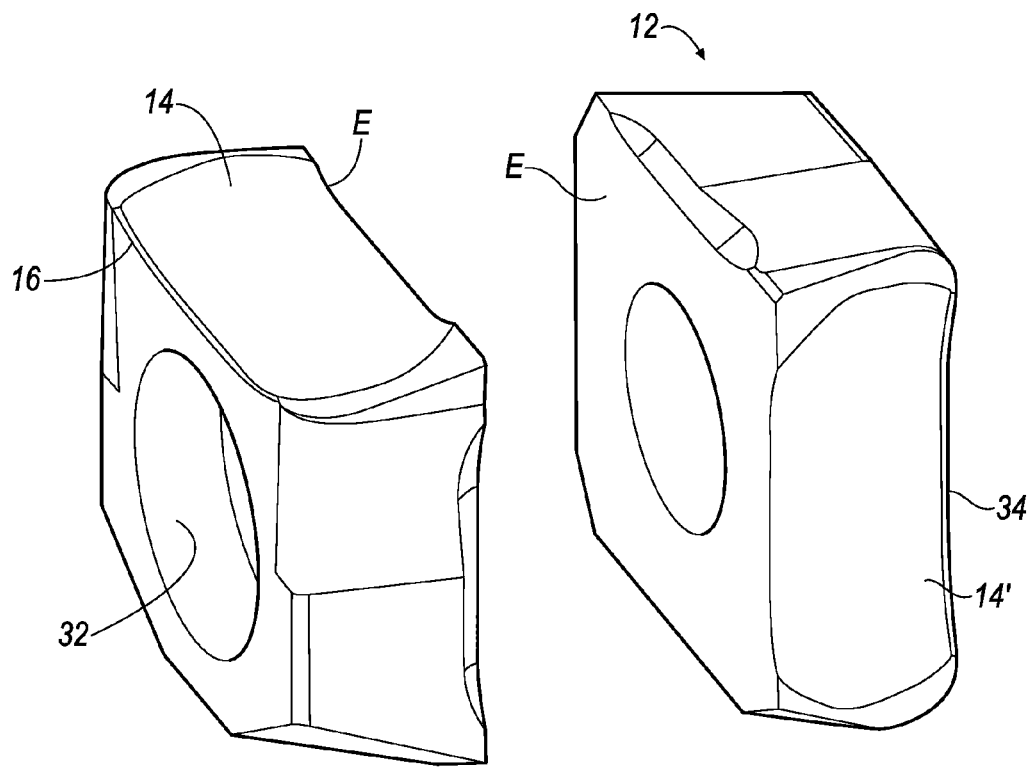
FIG. 4 shows a perspective view, obliquely from the side, which shows the grooving insert according to FIG. 1 divided into two identical halves by an imaginary parting plane.

This imaginary division into two can be seen very easily in FIGS. 3 and 4. The cube-shaped grooving insert 10 has two geometrically identical cube halves which merge into one another in one piece in an imaginary parting plane E. To this end, the grooving insert 10 is cut away along this parting plane E in FIG. 4. Each of these cube halves has its main flank, its rake face (the runout of the flute projects slightly into the other cube half) and its cutting edge and the associated prismatic supporting side.

Figure 6:
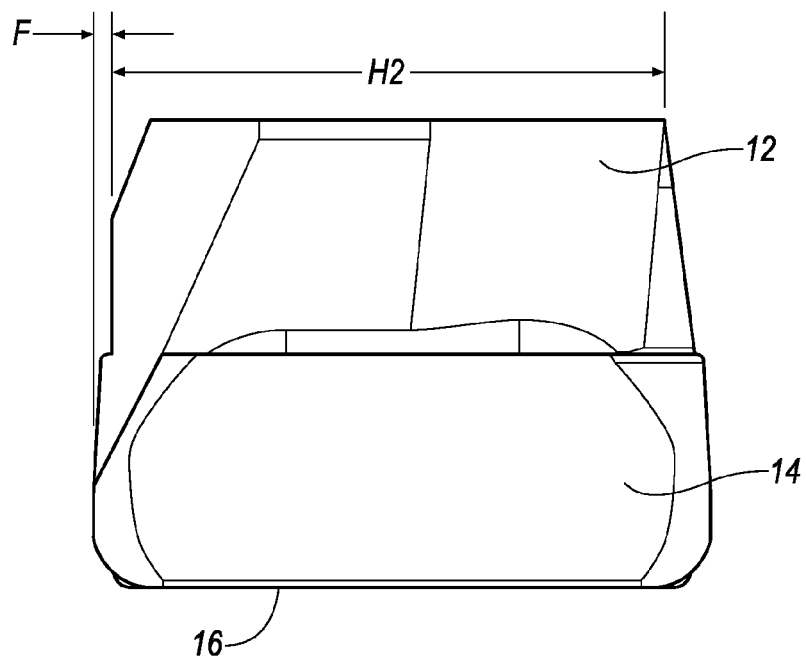
FIG. 6 shows a plan view of the rake face of the grooving insert according to FIG. 1.

The requisite dimensions of the grooving insert 10, which are decisive for the indexability, can be seen properly in FIGS. 5 and 6. Since the grooving insert 10 is designed to be indexable, the cutting edges 16 and 34 have the same length, i.e. the width B1 along the cutting edge 16 is identical to the width B2 along the cutting edge 34. The maximum height and width are therefore identical. Only the length L is at most as large as B1 and B2, but is preferably less than B1 and B2, and so the length constitutes the smallest edge dimension of the cube.

The "clearance" is also important for the functioning of the grooving insert 10, i.e. the grooving insert 10 must taper toward the rear, i.e. in the opposite direction to the feed direction of the cutting edge 16 or 34 in use, so that no contact with the workpiece can take place in this region. The plan view according to FIG. 6 shows that the grooving insert 10 runs slightly inward toward the rear side 30 or is even stepped inward (clearance F). The dimension H2 is consequently less than B1. This taper must of course also be present for the cutting edge 34; therefore the dimension H1 is also less than B2. Since the cube halves are identical, H1 is equal to H2.

With respect to the cutting edge used just at that moment (according to FIG. 5 the cutting edge 16), it is seen in plan view of the main flank that the second cutting edge 34 not in use is shifted inward, i.e. it is offset inward in a protected manner, while the other cutting edge 16 is working.

Figure 7:
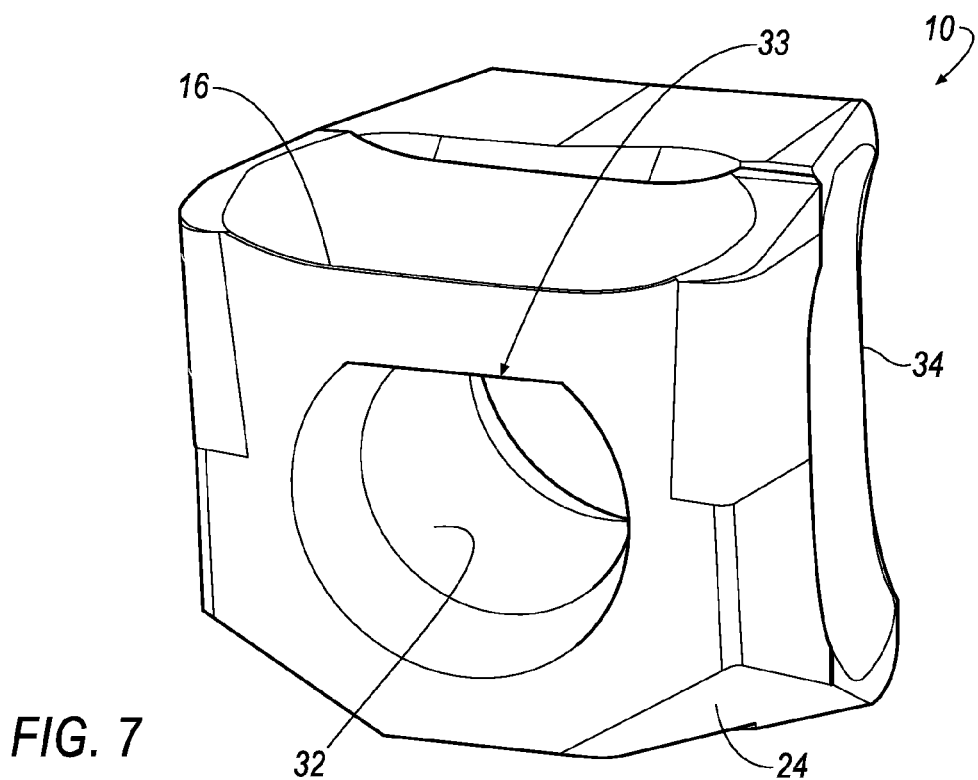
FIG. 7 shows a perspective view of a further embodiment of the grooving insert according to the invention with modified fastening opening.
Figure 8:
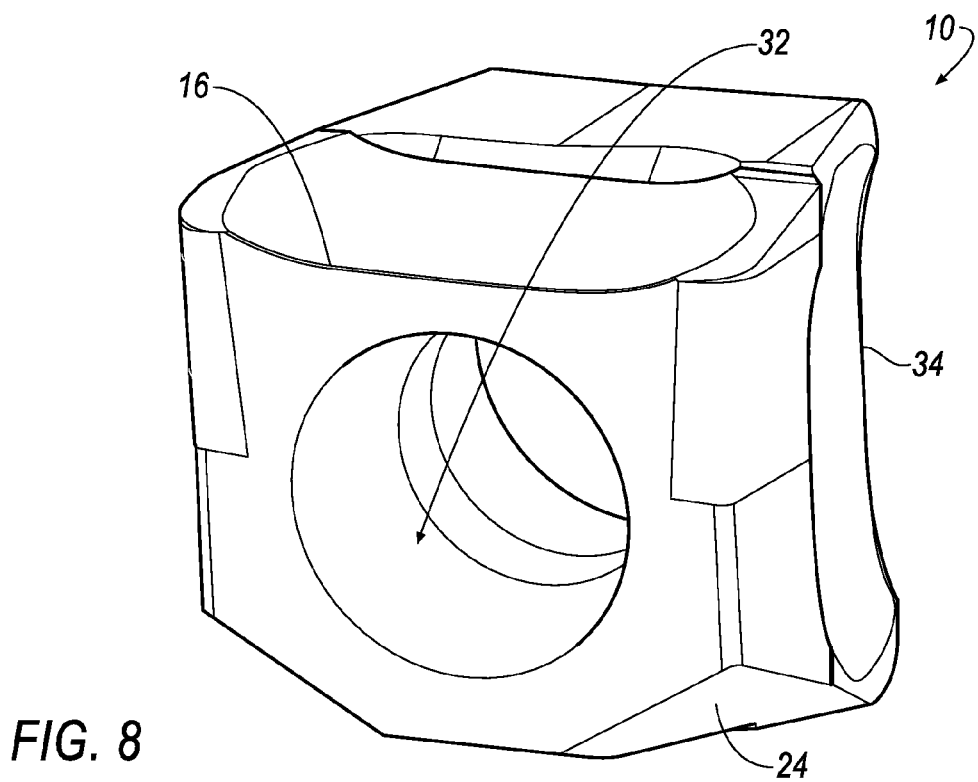
FIG. 8 shows a perspective view of yet another embodiment of the cutting insert according to the invention.

The embodiments according to FIGS. 7 and 8 correspond substantially to those according to FIGS. 1 to 6, although the fastening opening 32 is modified.

In the embodiment according to FIG. 7, the opening 32 has a chord-like flat side 33, such that the opening 32 deviates from the ideal cylindrical or conical shape.

In the embodiment according to FIG. 8, on the other hand, the opening 32 is provided toward the flank 18 with a "rounded countersink" of variable radius, that is to say with a geometry deviating from the conical shape. These variants of the opening permit advantageous fastenings of the grooving insert 10 on the tool holder.

It should also be emphasized with regard to the embodiment according to FIGS. 1 to 8 that the cutting edges 16, 34, in plan view of the flank 18, run substantially at right angles to one another.

The tool holder 40 for the tangential grooving inserts 10 according to the preceding figures is shown in FIG. 9. In width B, the tool holder 40 is at most as large as the grooving insert 10, preferably slightly smaller, so that only the grooving insert 10 is in contact with the workpiece during cutting-off or deep recessing or during side milling.

On account of the excellent seating of the tangential grooving insert 10 in the seat 42, designed as a step, of the tool holder 40, the latter can project to a considerable degree. The grooving insert 10 is put onto the tool holder 40 in an upright position (height H runs in the direction of rotation); the relative rotation between the workpiece and the grooving insert 10 takes place along the flank 18, which is oriented tangentially to the workpiece and merges into a front end face 44 on the tool holder side. However, the end face 44 is offset slightly rearward relative to the flank 18.

The lateral supporting surfaces 24 on the cutting insert preferably rest over the full surface area on lateral mating surfaces of the tool holder 40, and therefore on lateral mating surfaces 48. On the tool holder, therefore, there is a concave receptacle with laterally raised margins which improve the fixing in position and the positioning of the grooving insert in the seat 42. In order to avoid overdetermination, the surface 22 is at a distance from the mating surface 46.

Owing to the fact that the lateral mating surfaces 48 run obliquely toward one another and also additionally run tilted slightly downward from the end face 44, a type of wedge effect is obtained, which is directed firstly toward the center (with respect to the width B) and secondly in the direction of a bearing surface 50, against which the rear side 30 of the grooving insert 10 likewise bears as far as possible over the full surface area.

Owing to the fact that the lateral mating surfaces 48 run obliquely toward one another and also additionally run tilted slightly downward from the end face 44, a type of wedge effect is obtained, which is directed firstly toward the center (with respect to the width B) and secondly in the direction of a bearing surface 50, against which the rear side 30 of the grooving insert 10 likewise bears as far as possible over the full surface area.

Owing to the fact that the lateral mating surfaces 48 run obliquely toward one another and also additionally run tilted slightly downward from the end face 44, a type of wedge effect is obtained, which is directed firstly toward the center (with respect to the width B) and secondly in the direction of a bearing surface 50, against which the rear side 30 of the grooving insert 10 likewise bears as far as possible over the full surface area.

An optionally provided, threaded opening 52 is in alignment with the opening 32 and serves to receive a clamping screw.

It can be seen that a groove 54 is provided at the transition between the bearing surface 50 and the mating surfaces 46, 48, the width b of said groove 54 preferably corresponding to half the length L of the grooving insert 10.

The side view of the tool holder 40 in FIG. 10 shows optional angular relationships. It can thus be seen that the bearing surface 50 is not only directed perpendicularly to the top side 60 but is preferably directed obliquely forward relative to the grooving insert 10 in order to overlap the latter toward the top. The bearing surface 50 is therefore inclined forward at an angle of up to 30°, in particular at an angle which can be 5° to 15°. This angle can also be related to a perpendicular to the top side 60 if the latter runs parallel to the feed direction.

According to the preferred embodiment, the bearing surface 50 is designed to be planar and has no channel-shaped recess.

The grooving insert 10 bears against the bearing surface 50 over the full surface area.

The central mating surface 46, which like the central surface 22 should as far as possible run parallel to the associated cutting edge 16, is tilted rearward and downward by up to 45° relative to the top side 60. The side edges 62 which form the lateral ends of the lateral mating surfaces 48 run, in side view, parallel to the central mating surface 46 or at an angle of up to 45° to the latter.

The surface 22 is at a distance from the mating surface 46 over a minimum gap, such that contact at the lateral supporting surfaces 24 is ensured.

The opening 52 can run perpendicularly to the bearing surface 50, but this need not necessarily be the case.

The tool (deep-recessing tool, cutting-off tool or a side milling cutter) with the tool holder 40 described above and the tangential grooving insert 10 fastened thereto can be seen in the embodiments according to FIGS. 12 to 17. For orientation, the feed direction V and the direction of rotation R between workpiece and cutting edge are also shown in FIG. 12. The upright, that is to say tangential, embodiment of the cutting inserts 10 can easily be seen. The position of the second cutting edge 34 is in this case selected in such a way that it is not in contact with the workpiece during the cutting with the first cutting edge 16 but rather is in an inward position relative to the same, that is to say it is displaced with respect to the width B toward the center and is thereby protected. The same also applies to the first cutting edge 16 if the second cutting edge 34 is in operation.

Furthermore, as can easily be seen in the figures, the lateral mating surfaces 48 running upward and outward result in "teeth" 70 at the corners of the tool holder 40, said teeth 70 locating the grooving insert 10 in a fixed position.

In the embodiments according to FIGS. 12 to 14, the top side 60 of the tool holder 40 is embodied with a rake face extension 72 which runs upward in a curved manner and which adjoins the top side 12 and the associated rake face 14 and serves for the chip disposal.

According to FIG. 12, the grooving insert can be fastened only via a front-side clamping screw 80 or, according to FIG. 13, via the "clamping bolt" 82, which can be actuated from the front end face 44 (FIG. 13) or from the top side 60 (FIG. 14).

The embodiment according to FIG. 15 corresponds to that according to FIG. 13, although a clamping shoe 84 pressing from above against the top side 12 is also additionally provided.

The fastening according to the embodiment according to FIG. 16 is effected via a clamping screw 82 and additionally via a clamping shoe 84, and the fastening in the embodiment according to FIG. 17 is effected solely via a clamping shoe 84. In this embodiment, the grooving insert 10 also does not need an opening 32.

The grooving insert 10 is produced by a pressing technique, in particular by sintering, wherein, on account of the prisms arranged offset from one another and the different positions of the cutting edges 16, 34, the compression should be effected in two or more compression directions.

In the preferred embodiment, monoaxial pressing in a direction running diagonally to the parallelepiped or cube is conceivable as an alternative.

The invention is distinguished by a tool which permits large grooving depths or, more generally, cutting depths without loss of clamping force. The tangentially clamped grooving insert 10 is given an additional clamping force (self-amplifying effect) by the cutting force.

Alternative embodiments also provide cutting edges on one or both side edges.

Furthermore, the cutting edge can also be round or V-shaped, rather than approximately linear as shown.

What is claimed is:

1. A grooving insert comprising a cutting edge extending over the width of the grooving insert, a main flank and a rake face and also a supporting side opposite the rake face, wherein the grooving insert has a substantially cube-shaped outer contour and consists of two geometrically identical cube halves merging into one another in a parting plane, wherein each cube half has a separate cutting edge and the cube halves lie so as to be rotated by 90° relative to one another and turned by 180° relative to one another, and wherein the supporting side is convexly shaped at least at the margin toward the main flank and has an increasing height toward its center.

2. The grooving insert as claimed in claim 1, wherein the grooving insert comprises a tangential grooving insert.

3. The grooving insert as claimed in claim 1, wherein the grooving insert is a tangential grooving insert and has a substantially parallelepiped-shaped, preferably cube-shaped outer contour and two cutting edges which are formed by two outer edges of the parallelepiped which are not adjacent to one another.

4. The grooving insert as claimed in in claim 1, further comprising a fastening opening starting from the main flank.

5. The grooving insert as claimed in claim 1, wherein the opposite corners at the transition of supporting side, main flank and side surfaces are beveled, preferably in a planar manner.

6. The grooving insert as claimed in claim 5, further comprising lateral supporting surfaces formed by the bevels run obliquely toward one another relative to a central surface lying in between.

7. The grooving insert as claimed in claim 6, wherein the central surface is flat and/or runs parallel to the cutting edge and/or obliquely away from the associated rake face with increasing distance from the main flank.

8. The grooving insert as claimed in claim 1, wherein the second cutting edge has a separate, associated supporting side which is shaped like the supporting side of the first cutting edge.

9. The grooving insert as claimed in claim 1, wherein each cutting edge has its own prismatic supporting side on its cube half and/or in that the cutting edges have the same width and have in each case a reduced width in the opposite direction to the associated feed direction and toward the associated rear side.

10. A tool comprising a tool holder and a grooving insert which can be detachably fastened to it as claimed in claim 1, wherein the tool is a deep-recessing, a cutting-off tool, or a side milling cutter.

11. The tool as claimed in claim 10, wherein the tool holder has lateral mating surfaces for the supporting surfaces, at least sections of said mating surfaces being formed complementary to the supporting surfaces.

12. The tool as claimed in claim 10, further comprising a bearing surface on the tool holder for the side of the grooving insert which is opposite the flank to bear against, wherein the bearing surface and the side edges of the mating surfaces are at an angle of 90° to one another in side view.

13. The tool as claimed in one of claim 10, further comprising a bearing surface on the tool holder for the side of the grooving insert which is opposite the flank to bear against, wherein the bearing surface is inclined forward relative to the grooving insert at an angle of up to 30°.

14. The tool as claimed in claim 11, further comprising a central mating surface parallel to or at an angle of at most 45° to the lateral mating surfaces.

15. The tool as claimed in claim 10, further comprising a main flank that projects beyond the end face of the tool and/or in that the top side of the tool holder has a rake face extension extending from the transition to the rake face and upward in a curved manner.

* * * * *